United States Patent
Baracca et al.

(10) Patent No.: US 11,994,168 B2
(45) Date of Patent: May 28, 2024

(54) BEARING UNIT FOR WINDROWERS

(71) Applicant: AKTIEBOLAGET SKF, Gothenburg (SE)

(72) Inventors: Fausto Baracca, Massa (IT); Fabio Cavacece, Rome (IT); Pasquale Frezza, Aversa (IT); Andrea A Bertolini, Carrara (IT)

(73) Assignee: AKTIEBOLAGET SKF (SE)

( * ) Notice: Subject to any disclaimer, the term of this patent is extended or adjusted under 35 U.S.C. 154(b) by 21 days.

(21) Appl. No.: 17/738,747

(22) Filed: May 6, 2022

(65) Prior Publication Data
US 2022/0364599 A1    Nov. 17, 2022

(30) Foreign Application Priority Data
May 14, 2021    (IT) .......................... 102021000012425

(51) Int. Cl.
*F16C 35/063*    (2006.01)
(52) U.S. Cl.
CPC .................................. *F16C 35/063* (2013.01)
(58) Field of Classification Search
CPC ....... F16C 33/586; F16C 35/06; F16C 35/063
See application file for complete search history.

(56) References Cited

U.S. PATENT DOCUMENTS

| | | | |
|---|---|---|---|
| 2,766,080 A | 10/1956 | Fineran | |
| 3,797,901 A * | 3/1974 | Smith | F16C 35/063 384/541 |
| 4,687,351 A * | 8/1987 | Martinie | F16C 35/063 384/541 |
| 2006/0291764 A1* | 12/2006 | Ravindra | F16C 35/063 384/541 |
| 2021/0348653 A1* | 11/2021 | Baracca | F16C 33/586 |

FOREIGN PATENT DOCUMENTS

| | | |
|---|---|---|
| GB | 670403 | 4/1952 |
| JP | 2009293764 | 12/2009 |
| JP | 2010043690 | 2/2010 |

OTHER PUBLICATIONS

Search Report for corresponding Italy Patent Application No. 202100001425 dated Jan. 18, 2022.
Search Report for Italy Patent Application No. 202100001428 dated Jan. 18, 2022.
Search Report for Italy Patent Application No. 202100001422 dated Jan. 18, 2022.

* cited by examiner

*Primary Examiner* — James Pilkington
(74) *Attorney, Agent, or Firm* — Reed Smith LLP

(57) ABSTRACT

A bearing unit comprising a stationary radially outer ring with a spherical radially outer surface with a convex shape; a radially inner ring that is rotary about a central rotation axis of the bearing unit and is mounted on a rotating or oscillating shaft in which a diametrical through-hole formed in a first cylindrical portion is used to receive an elastic element for locking the radially inner ring on the shaft; a plurality of rolling bodies interposed between the radially outer ring and the radially inner ring to enable the relative rotation of the two rings; and at least one element for locking the radially inner ring on the shaft in which a pair of threaded through-holes formed in either the first cylindrical portion or the second cylindrical portion of the radially inner ring is used to receive respective grub screws for locking the radially inner ring on the shaft.

15 Claims, 4 Drawing Sheets

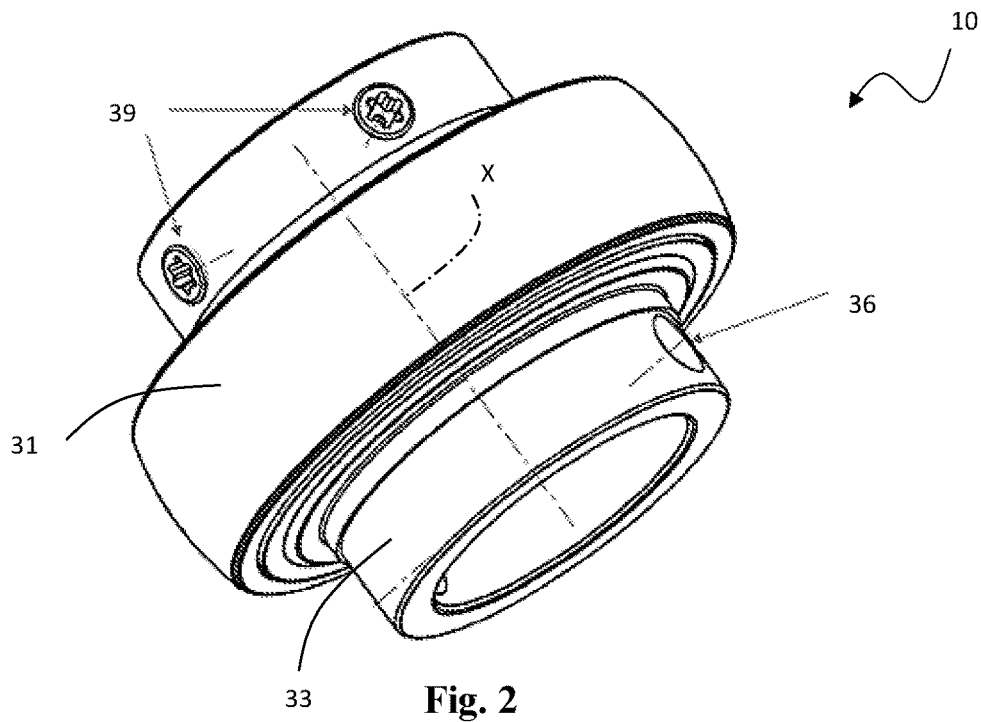
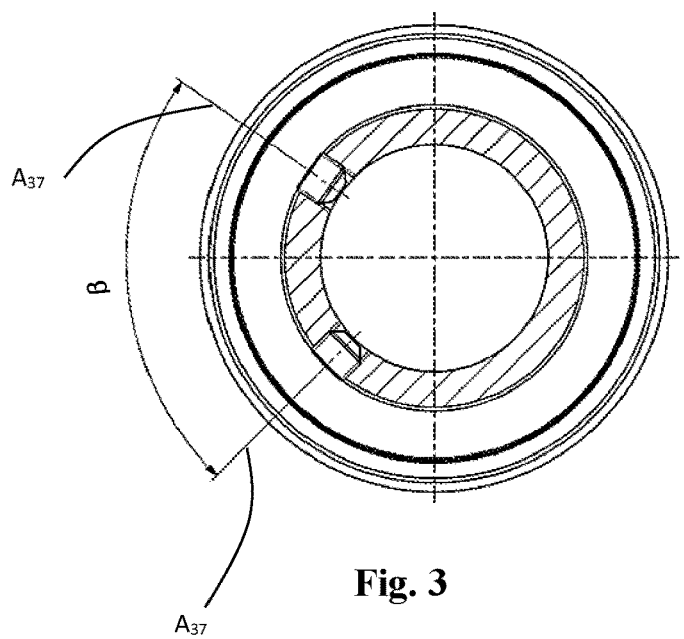
Fig. 2
Fig. 3

BEARING UNIT FOR WINDROWERS

CROSS REFERENCE OF RELATED APPLICATIONS

This application is based on and claims priority to Italian Patent Application No. 102021000012425 filed on May 14, 2021, under 35 U.S.C. § 119, the disclosure of which is incorporated by reference herein.

FIELD

The present disclosure relates to a bearing unit for windrowers provided with mechanical rakes coupled to a tractor. Said bearing unit is simple and cheap to produce, making it suitable for use in the manufacturing sector and in particular in the agricultural sector.

BACKGROUND

Bearing units may be provided with rolling elements and systems for clamping the unit to a rotary shaft.

BRIEF DESCRIPTION OF THE DRAWINGS

The disclosure will now be described with reference to the appended drawings illustrating various non-limiting exemplary embodiments by way of example, in which:

FIG. 2 is an axonometric projection of the bearing unit in FIG. 1, FIG. 3 is a lateral cross section of the bearing unit in FIG. 1.

DETAILED DESCRIPTION

Figure 1:
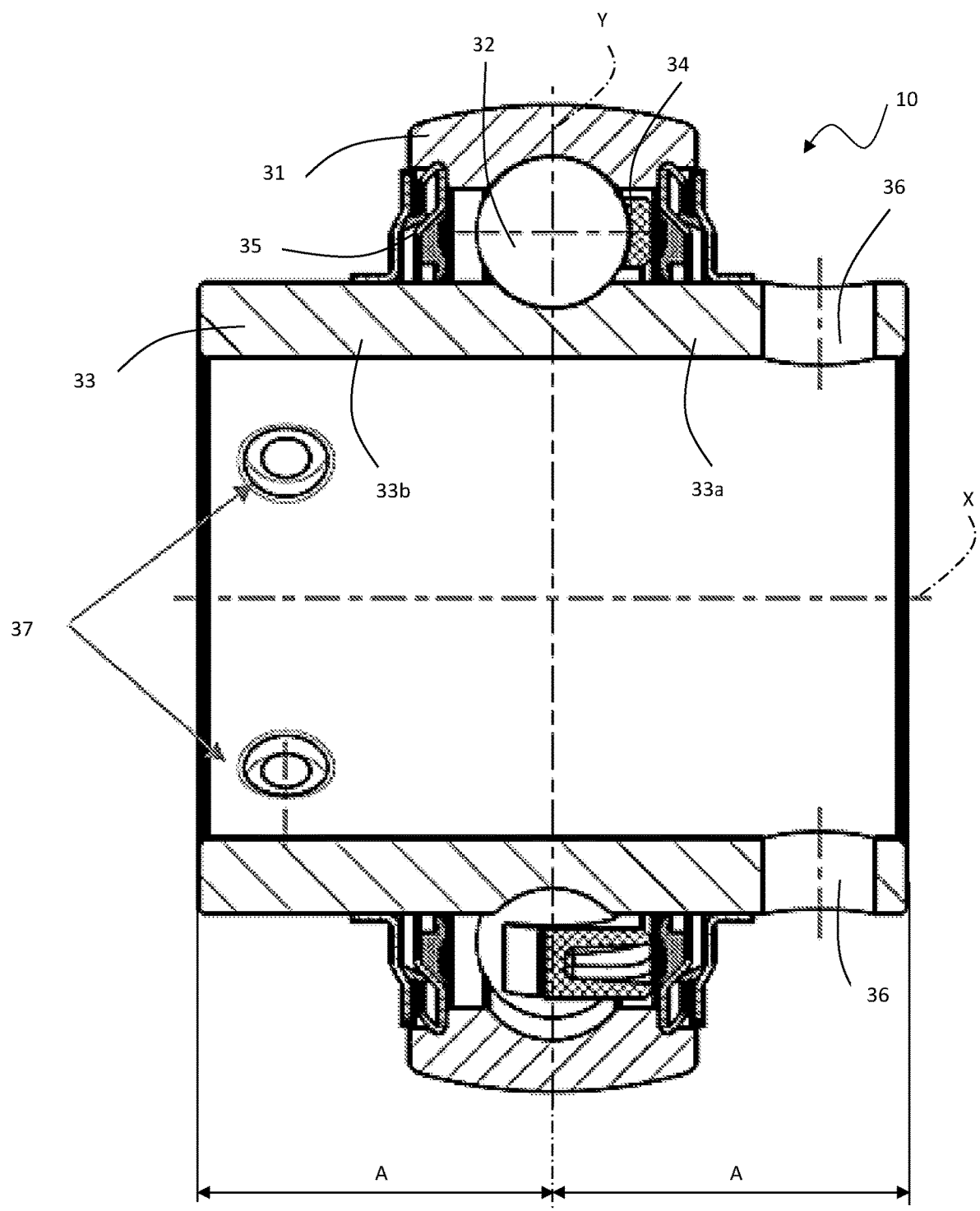
FIG. 1 is a cross-section view of a bearing unit provided with a locking system using an elastic pin and grub screws, according to exemplary embodiments of the present disclosure.

The bearing units are used to enable one component or unit to move relative to another component or unit. The bearing unit usually has a first component, for example a radially inner ring that is fastened to a first component, for example a rotary shaft; and a second component, for example a radially outer ring that is fastened to a second component, for example a stationary housing. Typically, as in the aforementioned examples, the radially inner ring is rotary while the radially outer ring is stationary, but there are applications in which the outer element rotates and the inner element is stationary. In any case, the rotation of one ring in relation to the other inside the rolling bearing unit is enabled by a plurality of rolling elements that are positioned between the cylindrical surface of one component and the cylindrical surface of the second component, normally referred to as raceways. The rolling elements can be balls, cylindrical or conical rollers, needle rollers and similar rolling elements.

Various different systems for fastening the radially inner ring to the rotary shaft may be provided. The simplest method, which is in particular suitable for hollow shafts, requires the radially inner ring and the shaft to include axially matching through-holes, through which an elastic element (pin, gudgeon or the like) is inserted under pressure to rigidly connect the two components.

Other more complex and more costly methods for coupling the rotary shaft and the radially inner ring together may be provided. These include, in ascending order of complexity/expense: using a pair of clamping elements to lock the radially inner ring on the shaft (for example a pair of socket-head screws or grub screws that are inserted into dedicated threaded through-holes formed in an axially end portion of the radially inner ring to stably lock the radially inner ring to the shaft. The two socket-head screws and the related holes are normally arranged at an angular distance of between approximately or about 60° and approximately or about 120°); interference fitting the radially inner ring on the rotary shaft; and using clamping collars to deform the end portion of the radially inner ring, which is forced onto the rotary shaft.

Despite the simplicity, the solution using through-holes and elastic pins has some drawbacks. The most common drawback occurs where a user, such as a manufacturer of agricultural machinery, requires both a bearing unit that can be mounted using an elastic element, and a bearing unit that has to be mounted by tightening the pair of grub screws on the shaft. This is because, for a given use, the optimal positioning of the bearing unit does not always correspond to the position of an elastic-pin through-hole on a rotary shaft, or because such bearing units are designed for another type of application, such as machines with solid rotary shafts.

Regardless of the reason in relation to the intended use, this means that the user has to have different bearing units in stock and, given the number of bearing units to be mounted, results in an excessive number of article codes in stock, and a consequent increased risk of error in the mounting phase.

A bearing unit with a system for locking the radially inner ring on a rotary shaft that overcomes the described drawbacks is disclosed.

The present disclosure provides a bearing unit that is versatile in terms of locking the radially inner ring on a rotary shaft for different machine layouts. This is achieved in the bearing unit according to the present disclosure by coupling two locking systems together, one with an elastic element and one with grub screws.

In particular, the radially inner ring has two cylindrical portions of equal axial dimensions projecting outwards from the radially outer ring on opposite sides of the radially outer ring. A diametrical through-hole is formed in one cylindrical portion to receive an elastic element. Furthermore, according to the disclosure, a pair of threaded through-holes are also provided for insertion of the grub screws. This enables either one of the two locking systems to be used (with an elastic element or with grub screws) or both (one with a plug and one with a locking pin).

Advantageously, the pair of threaded through-holes can be formed in any of the cylindrical portions of the radially inner ring.

Advantageously, where the pair of threaded holes is formed in the cylindrical portion provided with through-holes for the elastic element, one of the two holes of the pair of threaded holes is positioned at a predetermined angle from the diametrical through-hole.

The present disclosure therefore provides a bearing unit including a radially inner ring provided both with a through-hole and a pair of threaded holes having the features set out in the attached claims.

One embodiment of a bearing unit 10 according to the present disclosure is described below purely by way of example and with reference to the aforementioned figures. The bearing unit 10 for use in the agricultural sector and/or manufacturing industry (for example the textile, mining, motor-vehicle or food industries) can be interposed for example between a rotary shaft and a housing element (not covered by the present disclosure).

With specific reference to FIG. 1, the bearing unit 10 is for example used in a windrower provided with mechanical rakes coupled to a tractor, and includes: a stationary radially outer ring having a spherical radially outer surface with a convex shape, a radially inner ring 33 that is rotary about a central rotation axis X of the bearing unit 10, mounted on a rotating or oscillating shaft (of a known type, and therefore not shown in the figure) of the rake; a plurality of rolling bodies 32 interposed between two rings to enable the relative rotation thereof, and a cage 34 for the rolling bodies to hold the rolling elements of the row of rolling bodies 32 in position.

Throughout the present description and the claims, terms and expressions indicating position and orientation, such as "radial" and "axial", should be understood with reference to the central axis of rotation X of the bearing unit 30.

According to various embodiments, the bearing unit 10 is also provided with sealing means 35 to seal the bearing unit from the external environment. Hereinafter, the sealing means 35 can also be referred to more simply as seals 35, and shall be understood to refer to the same component.

The radially inner ring 33 is split about an axis Y of symmetry of the plurality of rolling bodies 32 into two cylindrical portions 33*a*, 33*b* of equal axial dimensions A projecting outwards from the radially outer ring 31 on opposite sides of said radially outer ring 31. A diametrical through-hole 36 is provided in a first cylindrical portion 33*a* to receive an elastic element, which is of a known type and is therefore not shown in the figure. The elastic element is inserted into the diametrical through-hole 36 and through the oscillating shaft to lock the radially inner ring 33 onto said oscillating shaft.

Furthermore, according to the disclosure, a pair of threaded through-holes 37, 38 is also provided on the radially inner ring 33 for insertion of the grub screws 39. This enables either one of the two locking systems to be used (with an elastic element or with grub screws) or both (one with a plug and one with a locking pin).

Advantageously, the pair of threaded through-holes 37, 38 can be formed in either of the two cylindrical portions 33*a*, 33*b* of the radially inner ring 33 and the angular distance between the two holes of the pair of threaded through-holes 37, 38 is given by the angle β, which may be between approximately or about 60° and 120°.

In particular, with reference to FIGS. 1 to 3 and according to various embodiment of the disclosure, the pair of threaded through-holes 37 is formed in the second cylindrical portion 33*b*, i.e., on the side opposite the first cylindrical portion 33*a* provided with through-holes 36 for the elastic element.

Figure 4:
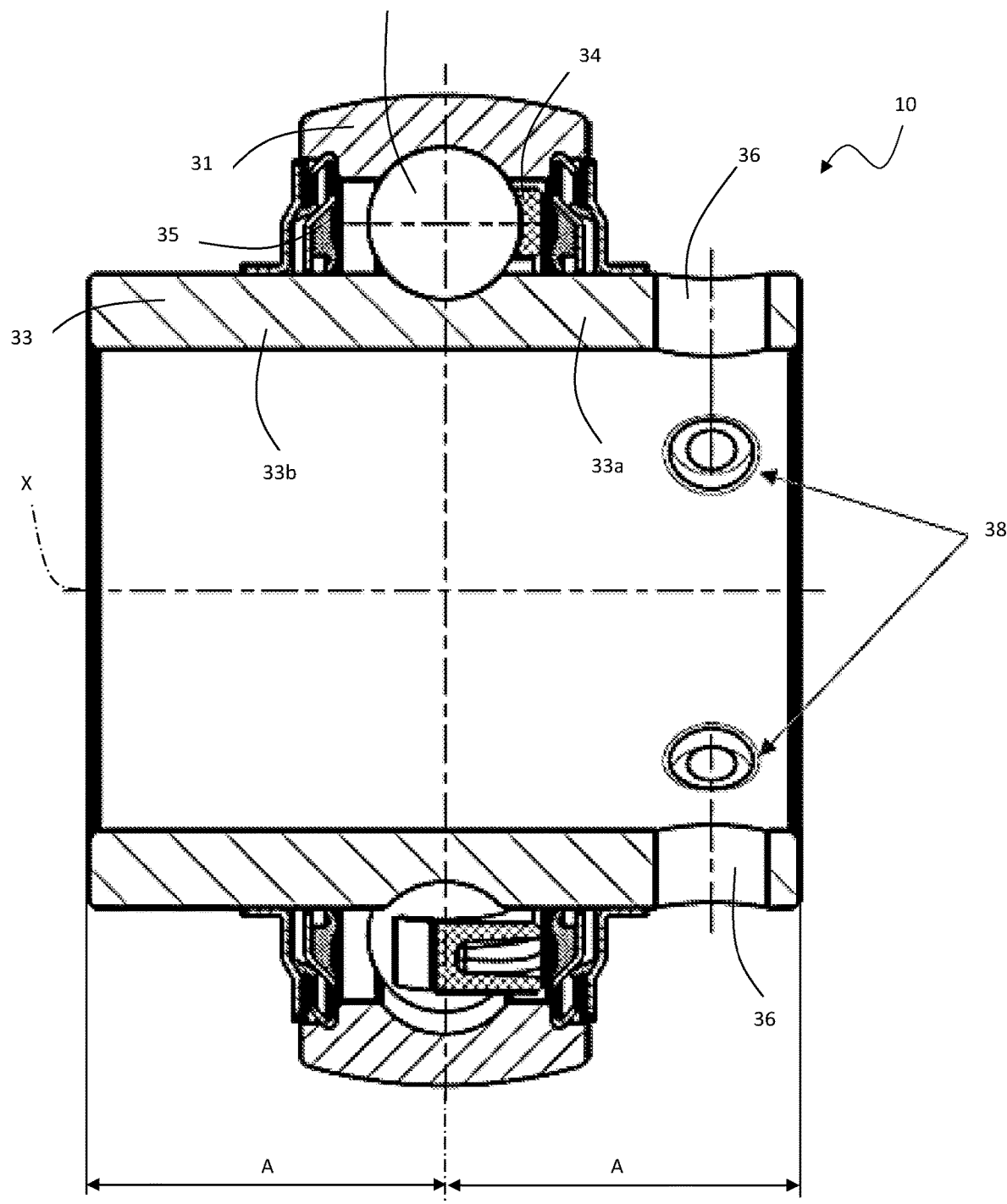
FIG. 4 is a cross-section view of a bearing unit provided with a locking system using an elastic pin and grub screws, according to exemplary embodiments of the present disclosure.
Figure 5:
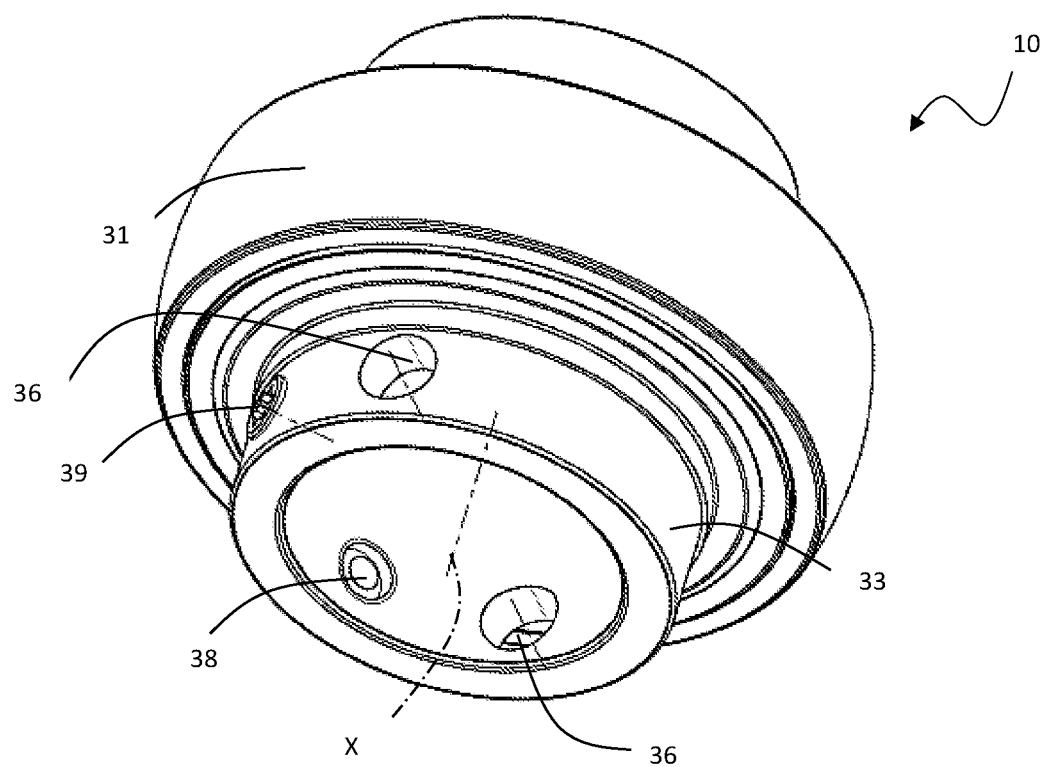
FIG. 5 is an axonometric projection of the bearing unit in FIG. 4.
Figure 6:
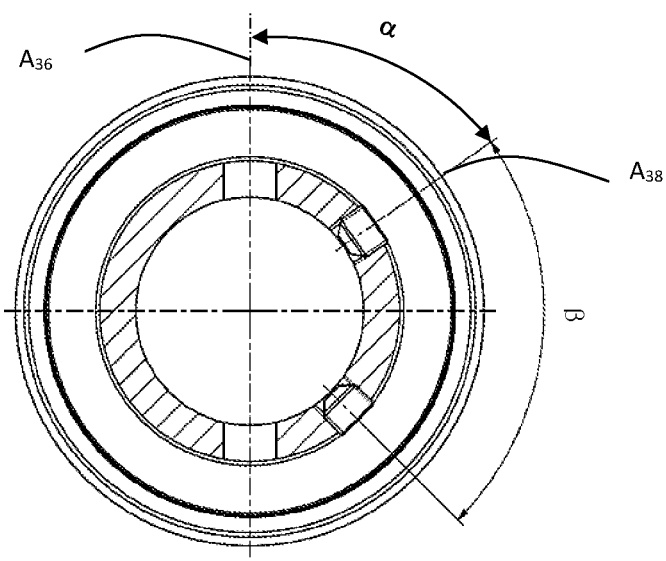
FIG. 6 is a lateral cross section of the bearing unit in FIG. 4.

In a second embodiment of the disclosure, shown in FIGS. 4 to 6, the pair of threaded through-holes 38 is formed in the first cylindrical portion 33*a* provided with through-holes 36 for the elastic element.

Advantageously, the axis A38 of a hole of the pair of threaded through-holes 38 formed in the first cylindrical portion 33*a*, including the diametrical through-hole 36 for the elastic element, is positioned at a predetermined angle α from the axis A36 of the through-hole 36 (as shown in FIG. 6). The angle α is preferably between 30° and 60°.

According to the disclosure, the bearing unit has been developed to optimize production and stock, as well as to make the characteristics of two different machines interchangeable. The bearing unit provides for locking the radially inner ring in relation to the oscillating shaft, incorporating both the through-hole for the elastic element and a pair of threaded holes for the grub screws. As a result, a user mounting the bearing unit in a first type of machine can use the locking method with an elastic element or the locking method with a pair of grub screws, mounting the bearing unit in any position along the oscillating shaft, and not necessarily in line with the through-hole. Conversely, a user mounting the bearing unit on any other type of machine that does not include a rotary shaft with through holes can use the grub-screw clamping system. It is evident that both locking methods can be used simultaneously to guarantee an optimal axial hold, by increasing the force required to cause an axial movement of the bearing unit. Finally, the option of having two threaded holes on one side of the radially inner ring 33 or on the other side thereof makes it possible to provide different solutions including as a function of the size of the bearing unit, and to provide alternative mounting solutions, including for maintenance operations.

Another novel aspect of the disclosure is to increase the axial length 2A of the radially inner ring 33. In various layouts, the radially inner ring is asymmetrical in relation to the vertical axis Y of the bearing unit 10 (axis passing through the centre of the rolling bodies 32 and of the raceways of the rings). Increasing the length of the ring and in particular making the ring symmetrical (in relation to the vertical axis Y of the bearing unit) improves the balance of the system.

A bearing unit according to various embodiments provides: versatility by providing two different locking systems, and can be applied to different machine layouts; a greater axial hold compared to the known solutions by using both of the locking systems, improved balance of the bearing unit by increasing the axial length and symmetry of the radially inner ring; using a single catalogue product without the need for dedicated production processes other than the drilling and threading operation; and a single item for two different machines is easier for users to manage. The concept of management used above refers to stock, manufacturing and sales interfacing, machine implementation, operator training, etc.

In addition to the embodiments described above, numerous other variants of the disclosure are possible. Such embodiments should be understood to be examples and do not limit the scope, applications or possible configurations of the disclosure. Indeed, although the description provided above enables the person skilled in the art to carry out the present disclosure at least according to one example configuration thereof, numerous variations of the components described could be used without thereby moving outside the scope of the disclosure, as defined in the attached claims interpreted literally and/or according to the legal equivalents of same.

We claim:

1. A bearing unit, comprising:
   a radially outer ring comprising a spherical radially outer surface with a convex shape, wherein the radially outer ring is stationary, a radially inner ring, rotatable around a central rotation axis (X) of the bearing unit, wherein the radially inner ring is configured to be mounted on a rotating or oscillating shaft;

a plurality of rolling bodies interposed between the radially outer ring and the radially inner ring configured to allow the relative rotation of the radially outer ring and the radially inner ring, a first locking system configured to lock the radially inner ring on the rotating or oscillating shaft, the first locking system comprising:

a diametrical through hole formed on a first cylindrical portion of the radially inner ring, the diametrical through hole housing an elastic element locking the radially inner ring on the rotating or oscillating shaft, the diametrical through hole extending across an entire diameter of the radially inner ring; and a second locking system configured to lock the radially inner ring on the rotating or oscillating shaft, the second locking system comprising:

a pair of circumferentially spaced threaded through holes formed in one of the first cylindrical portion and a second cylindrical portion of the radially inner ring, the pair of threaded through holes being spaced apart by an angular distance ($\beta$) between axes of the pair of threaded through holes and housing respective grub screws locking the radially inner ring on the rotating or oscillating shaft.

2. The bearing unit of claim 1, wherein the pair of threaded through holes is formed in the second cylindrical portion, which is on an opposite side with respect to the first cylindrical portion provided with the diametrical through hole for the elastic element.

3. The bearing unit of claim 2, wherein the first cylindrical portion and the second cylindrical portion of the radially inner ring have the same axial dimension (A) and externally protrude beyond the radially outer ring, from opposite sides of the radially outer ring itself.

4. The bearing unit of claim 3, wherein the angular distance ($\beta$) between axes of the pair of threaded through holes is between 60° and 120°.

5. The bearing unit of claim 2, wherein the angular distance ($\beta$) between axes of the pair of threaded through holes is between approximately 60° and 120°.

6. The bearing unit of claim 1, wherein the first cylindrical portion and the second cylindrical portion of the radially inner ring have the same axial dimension (A) and externally protrude beyond the radially outer ring, from opposite sides of the radially outer ring itself.

7. The bearing unit of claim 6, wherein the angular distance ($\beta$) between axes of the pair of threaded through holes is between approximately 60° and 120°.

8. The bearing unit of claim 1, wherein the angular distance ($\beta$) between axes of the pair of threaded through holes is between approximately 60° and 120°.

9. A bearing unit, comprising:

a radially outer ring comprising a spherical radially outer surface with a convex shape, wherein the radially outer ring is stationary, a radially inner ring, rotatable around a central rotation axis (X) of the bearing unit, wherein the radially inner ring is configured to be mounted on a rotating or oscillating shaft, in which a diametrical through hole is made on a first cylindrical portion of the radially inner ring, the diametrical through hole being configured for housing an elastic element locking the radially inner ring on the rotating or oscillating shaft;

a plurality of rolling bodies interposed between the radially outer ring and the radially inner ring configured to allow the relative rotation of the radially outer ring and the radially inner ring, at least one locking element configured to lock the radially inner ring on the rotating or oscillating shaft, the at least one locking element comprising:

a pair of threaded through holes formed in one of the first cylindrical portion and a second cylindrical portion of the radially inner ring, the pair of threaded through holes being configured for housing respective grub screws locking the radially inner ring on the rotating or oscillating shaft;

wherein the pair of threaded through holes is formed in the first cylindrical portion provided with the diametrical through hole for the elastic element.

10. The bearing unit of claim 9, wherein the first cylindrical portion and the second cylindrical portion of the radially inner ring have the same axial dimension (A) and externally protrude beyond the radially outer ring, from opposite sides of the radially outer ring itself.

11. The bearing unit of claim 10, wherein an angular distance ($\beta$) between axes of the pair of threaded through holes is between 60° and 120°.

12. The bearing unit of claim 10, wherein an axis of one of the holes of the pair of threaded through holes is angularly distant from an axis of the diametrical through hole by an angle ($\beta$) of between approximately 30° and 60°.

13. The bearing unit of claim 9, wherein an angular distance ($\beta$) between axes of the pair of threaded through holes is between approximately 60° and 120°.

14. The bearing unit of claim 13, wherein an axis of one of the holes of the pair of threaded through holes is angularly distant from an axis of the diametrical through hole by an angle ($\beta$) of between approximately 30° and 60°.

15. The bearing unit of claim 9, wherein an axis of one of the holes of the pair of threaded through holes is angularly distant from an axis of the diametrical through hole by an angle ($\beta$) of between approximately 30° and 60°.

* * * * *